(12) United States Patent
Wu

(10) Patent No.: US 9,057,909 B2
(45) Date of Patent: Jun. 16, 2015

(54) LIQUID CRYSTAL LENS AND 3D DISPLAY DEVICE

(71) Applicant: Boe Technology Group Co., Ltd., Beijing (CN)

(72) Inventor: Naifu Wu, Beijing (CN)

(73) Assignee: Boe Technology Group Co., Ltd., Beijing (CN)

(*) Notice: Subject to any disclaimer, the term of this patent is extended or adjusted under 35 U.S.C. 154(b) by 0 days.

(21) Appl. No.: 14/090,641

(22) Filed: Nov. 26, 2013

(65) Prior Publication Data
US 2014/0160379 A1 Jun. 12, 2014

(30) Foreign Application Priority Data

Dec. 10, 2012 (CN) .......................... 2012 1 0529656

(51) Int. Cl.
| | |
|---|---|
| *G02F 1/1335* | (2006.01) |
| *G02B 27/22* | (2006.01) |
| *G02F 1/1347* | (2006.01) |
| *G02F 1/29* | (2006.01) |

(52) U.S. Cl.
CPC ...... *G02F 1/133526* (2013.01); *G02B 27/2214* (2013.01); *G02F 1/13471* (2013.01); *G02F 2001/294* (2013.01)

(58) Field of Classification Search
CPC .................................................. G02B 27/2214
USPC .......................................................... 349/15
See application file for complete search history.

(56) References Cited

U.S. PATENT DOCUMENTS

| | | | | |
|---|---|---|---|---|
| 8,149,342 | B2* | 4/2012 | Ijzerman et al. | 349/15 |
| 2007/0008617 | A1* | 1/2007 | Shestak et al. | 359/455 |
| 2010/0026920 | A1* | 2/2010 | Kim et al. | 349/15 |
| 2010/0328440 | A1* | 12/2010 | Willemsen | 348/59 |
| 2014/0049706 | A1* | 2/2014 | Park et al. | 349/15 |

FOREIGN PATENT DOCUMENTS

| | | |
|---|---|---|
| CN | 201749269 U | 2/2011 |
| CN | 102436101 A | 5/2012 |
| CN | 202948239 U | 5/2013 |

OTHER PUBLICATIONS

English translation of Chinese Office Action dated Sep. 24, 2014, for Chinese Application No. 2012105296563.
English translation of Office Action dated Feb. 12, 2015, for corresponding Chinese Application No. 201210529656.3.

* cited by examiner

*Primary Examiner* — Thanh-Nhan P Nguyen
(74) *Attorney, Agent, or Firm* — Kinney & Lange, P.A.

(57) ABSTRACT

A liquid crystal lens and a 3D display device are provided. The liquid crystal lens comprises a lower substrate, an upper substrate disposed opposite to the lower substrate and a common substrate disposed between the upper substrate and the lower substrate. A plurality of first lenses are disposed between the lower substrate and the common substrate, each of the first lenses only converging light component of the incident natural light in a first polarization direction. A plurality of second lenses are disposed between the upper substrate and the common substrate, each of the second lenses only converging the light component of the incident natural light in a second polarization direction different from the first polarization direction. The 3D display device of the invention can reduce loss of light energy and enhance display luminance of the 3D display device as a whole.

14 Claims, 6 Drawing Sheets

LIQUID CRYSTAL LENS AND 3D DISPLAY DEVICE

CROSS-REFERENCE TO RELATED APPLICATION

This application claims the benefit of Chinese Patent Application No. 201210529656.3 filed on Dec. 10, 2012, in the State Intellectual Property Office of China, the whole disclosure of which is incorporated herein by reference.

BACKGROUND OF THE INVENTION

1. Field of the Invention

Embodiments of the invention relates to 3D display technical field, more particularly, relates to a liquid crystal lens and a 3D display device having the same.

2. Description of the Related Art

In everyday life, people use two eyes to view external objects having senses of three-dimensional space around their surroundings. In three-dimensional (3D) display technology, people obtain three-dimensional space sense using binocular stereo vision principle, the main principle of which is to allow left and right eyes of a viewer to receive different images respectively, and the images received by the left and right eyes are analyzed and combined by brain, thereby making the viewer generate three-dimension feeling.

Currently, 3D display technology comprises naked eye type and glass type. The so-called naked eye technology is that 3D video images which have been encoded are transmitted to the left and right eyes separately by performing special processes on a display panel, so as to allow the viewer to experience three-dimensional feeling via naked eye without stereoscopic glasses.

Recently, in a display device for achieving naked eye display, a shield such as a grating (raster) barrier, a liquid crystal lens or the like is provided in front of a light source array of a liquid crystal display (LCD). A plurality of visual areas are formed at front side of the display panel using the grating barrier or the liquid crystal lens, so that light emitted from different sub-pixel units on the display panel is impinged on different visual fields. Therefore, eyes of the viewer may focus on the different visual fields, thereby generating 3D feeling.

The principle of the liquid crystal lens is that light beam is converged or scattered based on birefringence characteristic of liquid crystal molecules and arrangement orientation thereof varied with distribution of electric field, so that optical focus of the light beam can be changed in a small space by controlling arrangement orientations of the liquid crystal molecules by changing voltage. However, since the liquid crystal molecules themselves used in the liquid crystal lens have optical anisotropic characteristic, the light directed onto the liquid crystal lens is required to be polarized light. Thus, the light emitted from the display must be the polarized light to achieve the naked eye 3D display. For a non-polarized light display, such as an organic electroluminescent display (OLED), a plasma display panel (PDP) and a cathode ray tube (CRT) display, it is necessary to dispose a layer of polarizer between the display and the light barrier to change the emitted non-polarized light into the polarized light and then achieve 3D display effect by the liquid crystal lens. During such process, the light emitted from the display may be lost, thereby affecting transmittance of the 3D display device. Further, display brightness will be reduced by 50% or more, which may result in deterioration of the 3D display effect.

SUMMARY OF THE INVENTION

The invention has been made to overcome or alleviate at least one aspect of the above mentioned disadvantages.

Embodiments of the invention are to provide a liquid crystal lens and a 3D display device to achieve 3D display with high brightness.

According to an aspect of the invention, there is provided a liquid crystal lens comprising a lower substrate, an upper substrate disposed opposite to the lower substrate and a common substrate disposed between the upper substrate and the lower substrate. A plurality of first lenses are disposed between the lower substrate and the common substrate, each of the first lenses only converging light component of the incident natural light of which the polarization direction is a first direction. A plurality of second lenses are disposed between the upper substrate and the common substrate, each of the second lenses only converging the light component of the incident natural light of which the polarization direction is a second direction different from the first direction.

According to another aspect of the invention, there is provided a 3D display device comprising a display and the liquid crystal lens described above, the liquid crystal lens being disposed on the display.

BRIEF DESCRIPTION OF THE DRAWINGS

The above and other features of the invention will become more apparent by describing in detail exemplary embodiments thereof with reference to the accompanying drawings, in which.

DETAILED DESCRIPTION OF PREFERRED EMBODIMENTS OF THE INVENTION

Figure 1:
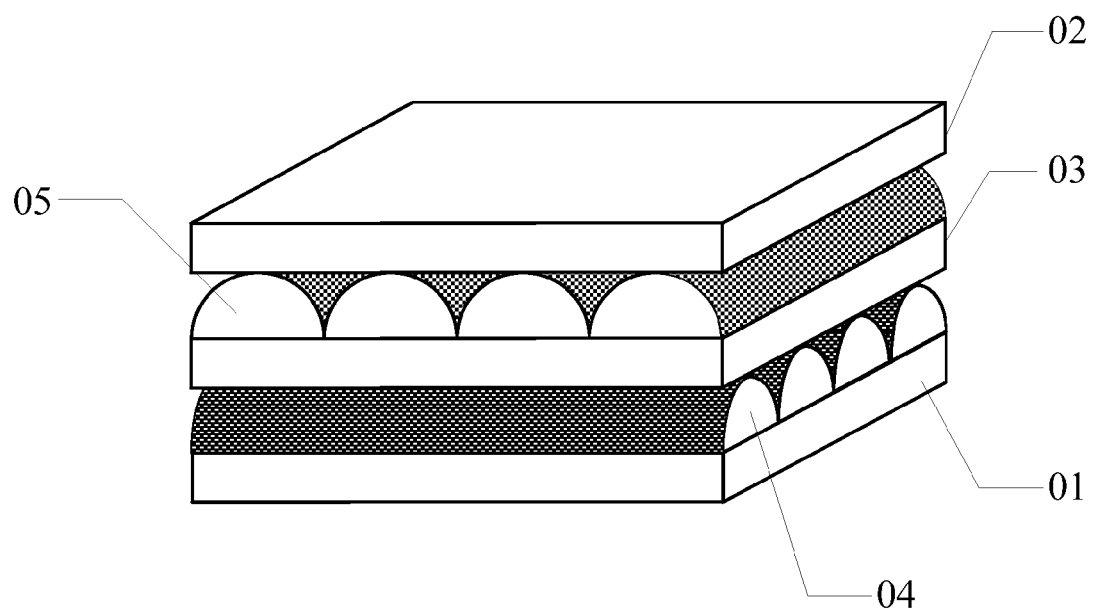
FIG. 1 is a schematic structural view showing a liquid crystal lens in accordance with an exemplary embodiment of the invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

Next, a liquid crystal lens and a 3D display device according to embodiments of the invention are described in detail with reference to drawings.

In the drawings, the thickness of each layer as well as the size of each region do not refer to the actual scale of the liquid crystal lens and the 3D display device, and it is only intended to schematically illustrate the invention.

According to an embodiment of the invention, as shown in FIG. 1, there is provided a liquid crystal lens comprising a lower substrate 01, an upper substrate 02 disposed opposite to the lower substrate 01, and a common substrate 03 disposed between the upper substrate 01 and the lower substrate 02.

In the liquid crystal lens described above, a plurality of first lenses 04 extending in a first direction are disposed between the lower substrate 01 and the common substrate 03. In a 3D display mode, each of the first lenses 04 only converges light component of incident natural light, of which a polarization direction is the same as the first direction.

Further, a plurality of second lenses 05 extending in a second direction, for example, different from the first direction, are disposed between the upper substrate 02 and the common substrate 03. In the 3D display mode, each of the second lenses 05 only converges the light component of the incident natural light, of which the polarization direction is the same as the second direction.

In the liquid crystal lens according to the embodiment described above, the 3D display can be achieved by converging the polarized light in two directions of the natural light emitted from a display by two overlapping lenses, i.e., the first and second lenses 04 and 05, respectively. Compared with the liquid crystal lens in the prior art in which the 3D display is achieved by adding a layer of polarizer onto the display, the liquid crystal lens of the invention can reduce loss of light energy, improve transmittance of the liquid crystal lens. Thus, display luminance of the 3D display device is greatly enhanced as a whole, and 3D display with high brightness is achieved.

For example, the first direction is set as a direction x and the second direction is set as a direction y. Each of the first lenses 04 may converge the polarized light in the direction x, i.e., the polarized light in the direction x will be converged at each focal point of the first lenses 04 after passing therethrough, and the polarized light in the direction y is not affected. Each of the second lenses 05 may converge the polarized light in the direction y, i.e., the polarized light in the direction y will be converged at each focal point of the second lenses 05 after passing therethrough, and the polarized light in the direction x is not affected. After passing through two layers of lenses, the non- polarized light is split into the polarized light in the direction and the polarized light in the direction y such that the 3D display is achieved.

In an exemplary embodiment, in the liquid crystal lens, extending directions of the first lenses 04 may be substantially orthogonal to that of the second lenses 05 each other, i.e., the first direction may be substantially orthogonal to the second direction each other.

For sake of convenient description, one example of the invention is illustrated below, taking the first direction orthogonal to the second direction each other as an example.

Specifically, since the first and second lenses 04 and 05 are disposed in two layers respectively, a difference in height may be generated therebetween. In order to avoid larger difference in focal length between the first and second lenses 04 and 05 caused by the difference in height therebetween, which may in turn result in larger difference in width of the visual fields of a viewer, in the 3D display mode, the focal point of each of the first and second lenses 04 and 05 are controlled to be located a horizontal plane which is parallel with the upper substrate 02 or the lower substrate 01 to maintain the width of the visual field of the left eye to be same as that of the right eye.

In an example of the invention, the first and second lenses 04 and 05 of the liquid crystal lens may have various specific structures. The specific structure of the first lenses 04 may be the same as or different from that of the second lenses 05. Original orientations of the liquid crystal molecules in the first lenses 04 are typically different from those in the second lenses 05 in order to allow the two lenses to converge incident light components in different directions, respectively.

Next, the specific structure of the first lenses 04 is described in detail.

Figure 2A:
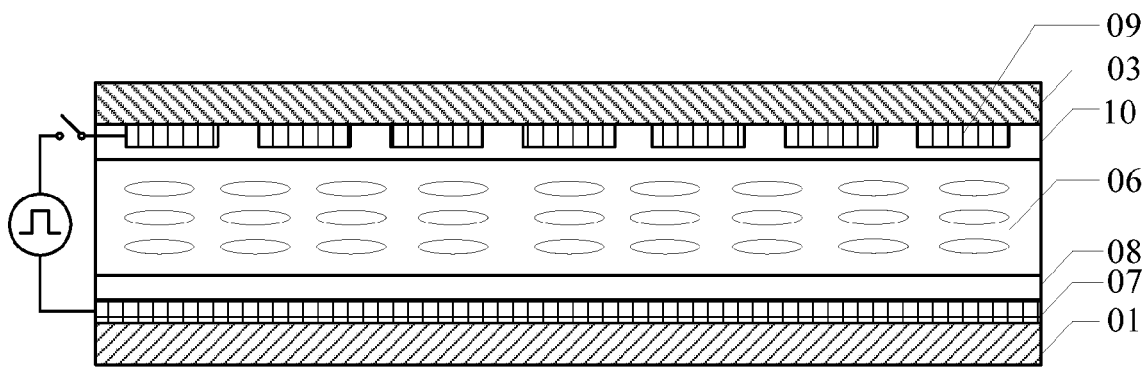
FIGS. 2a, and 2b, are schematic structural views showing first lenses in accordance with an exemplary embodiment of the invention.

Specifically, in the present embodiment, each of the first lenses 04 comprises a first transparent electrode 07, a first alignment film 08, a first liquid crystal layer 06, a second alignment film 10 and a second transparent electrode 09 arranged between the lower substrate 01 and the common substrate 03 in this order from the lower substrate 01, as shown in FIG. 2a.

Specifically, the first liquid crystal layer 06 is arranged between the substrate 01 and the common substrate 03. The first transparent electrode 07 is arranged on one side of the substrate 01 facing the first liquid crystal layer 06. The first alignment film 08 is arranged on one side of the first transparent electrode 07 facing the first liquid crystal layer 06. The second transparent electrode 09 is arranged on one side of the common substrate 03 facing the first liquid crystal layer 06. The second alignment film 10 is arranged on one side of the second transparent electrode 09 facing the first liquid crystal layer 06.

Further, in an exemplary embodiment, the second transparent electrode 09 may comprise a plurality of strip electrodes, and the first transparent electrode 07 may comprise a planar or plate electrode, as illustrated in FIG. 2a. In an alternative embodiment, the first transparent electrode 07 may comprise a plurality of strip electrodes, and the second transparent electrode 09 may comprise a planar or plate electrode. As shown in FIG. 2a, both of friction directions of the first and second alignment films 08 and 10 are perpendicular to an extending direction of the strip electrodes, i.e., the second transparent electrode 09. The liquid crystal in the first liquid crystal layer 06 is positive nematic liquid crystal.

In a 2D display mode, voltage is not applied to the first and second transparent electrode 07 and 09, and the liquid crystal molecules of the first liquid crystal layer 06 are orientated parallel in the first direction, for example, in a left-right direction as shown in FIG. 2a,, thereby the non-polarized light passing therethrough will not be affected by the first liquid crystal layer 06.

Figure 2B:
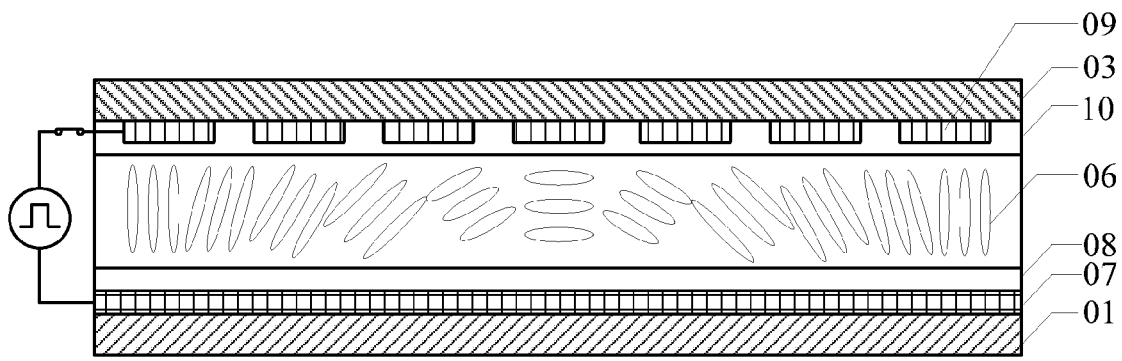

In the 3D display mode, as shown in FIG. 2b, when a predetermined voltage is applied to the first and second transparent electrode 07 and 09 to generate an electric field, the liquid crystal molecules in the first liquid crystal layer 06 corresponding to the first lenses 04 are deflectable to form a lenticular lens, thereby a modulation of the polarized light in the first direction is achieved, so that the polarized light in the first direction will converge at the focal point of the lenticular lens. FIG. 2b, is a schematic view showing the liquid crystal in one of the first lenses 04 when being deflected.

Next, the specific structure of the second lenses 05 is described in detail.

Figure 3A:
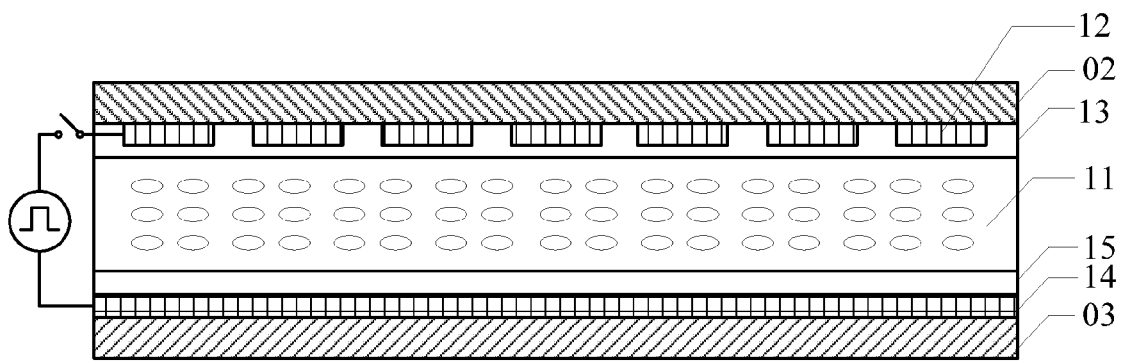
FIGS. 3a, to 3c, are schematic structural views second lenses in accordance with an exemplary embodiment of the invention.

Specifically, in the present embodiment, each of the second lens 05 comprises a third transparent electrode 12, a third alignment film 13, a second liquid crystal layer 11, a fourth alignment film 15 and a fourth transparent electrode 14 are arranged between the upper substrate 02 and the common substrate 03 in this order from the upper substrate 02, as shown in FIG. 3a.

Specifically, the second liquid crystal layer 11 is arranged between the upper substrate 02 and the common substrate 03. The third transparent electrode 12 is arranged on one side of the upper substrate 02 facing the second liquid crystal layer 11. The third alignment film 13 is arranged on one side of the third transparent electrode 12 facing the second liquid crystal layer 11. The fourth transparent electrode 14 is arranged on one side of the common substrate 03 facing the second liquid crystal layer 11. The fourth alignment film 15 is arranged on one side of the fourth transparent electrode 14 facing the second liquid crystal layer 11.

Further, in an exemplary embodiment, the third transparent electrode 12 may comprise a plurality of strip electrodes, and the fourth transparent electrode 14 may comprise a planar or plate electrode, as illustrated in FIG. 3a. In another embodiment, the fourth transparent electrode 14 may comprise a plurality of strip electrodes, and the third transparent electrode 12 may comprise a planar or plate electrode. As shown in FIG. 3a,, both of friction directions of the third and fourth alignment films 13 and 15 are substantially perpendicular to an extending direction of the strip electrodes, i.e., the third transparent electrode 12. The liquid crystal in the second liquid crystal layer 11 is positive nematic liquid crystal.

In the 2D display mode, voltage is not applied to the third and fourth transparent electrodes 12 and 14, and the liquid crystal molecules of the second liquid crystal layer 11 are orientated parallel in the second direction, for example, in a direction perpendicular to the paper in FIG. 3a,, thereby the non-polarized light passing therethrough will not be affected by the second liquid crystal layer 11.

Figure 3B:
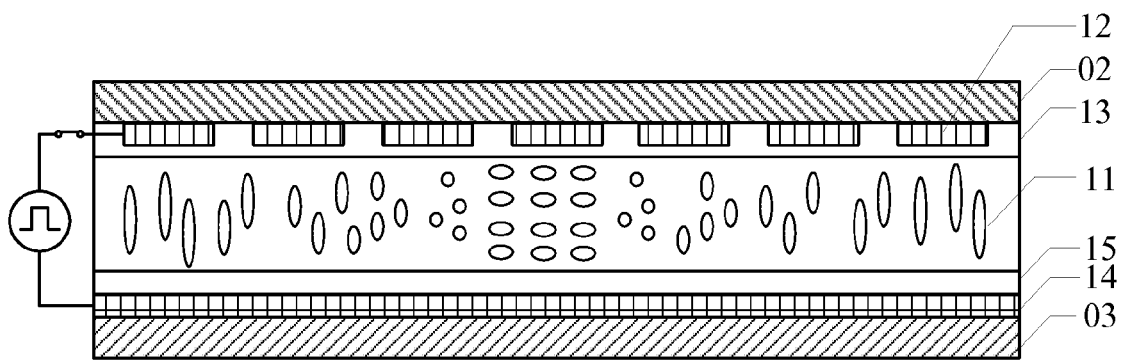
Figure 3C:
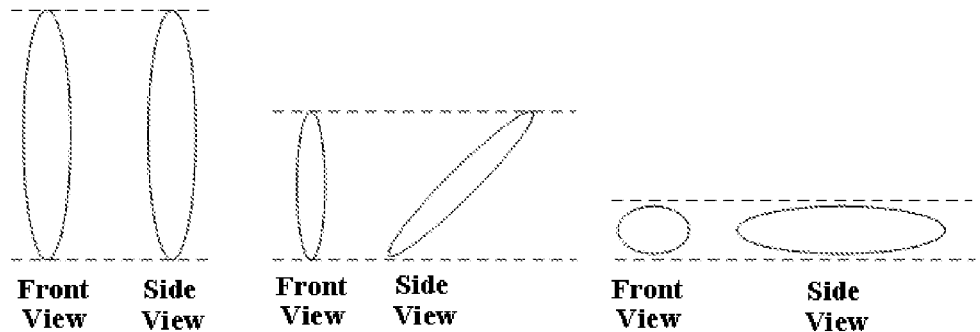

In the 3D display mode, when a predetermined voltage is applied to the third transparent electrode 12 and the fourth transparent electrode 14 to generate an electric field, the liquid crystal molecules in the second liquid crystal layer 11 corresponding to the second lenses 05 are deflectable to form a lenticular lens, thereby a modulation of the polarized light in the second direction is achieved, so that the polarized light in the second direction will converge at the focal point of the lenticular lens. FIG. 3b, is a schematic view showing the liquid crystal molecules in one of the second lenses 05 when being deflected. FIG. 3c, is a schematic view showing front and side views of the deflected liquid crystal as shown in FIG. 3b, different heights of the liquid crystal molecules may indicate different rotation degree of the liquid crystal molecules in the front view.

In an exemplary embodiment, it is desirable in the liquid crystal lens that the extending direction of the strip electrodes, specifically, the first transparent electrode 07 or the second transparent electrode 09, disposed between the lower substrate 01 and the common substrate 03 is perpendicular to that of the strip electrodes, specifically, the third transparent electrode 12 or the fourth transparent electrode 14, disposed between the upper substrate 02 and the common substrate 03 each other.

Figure 4A:
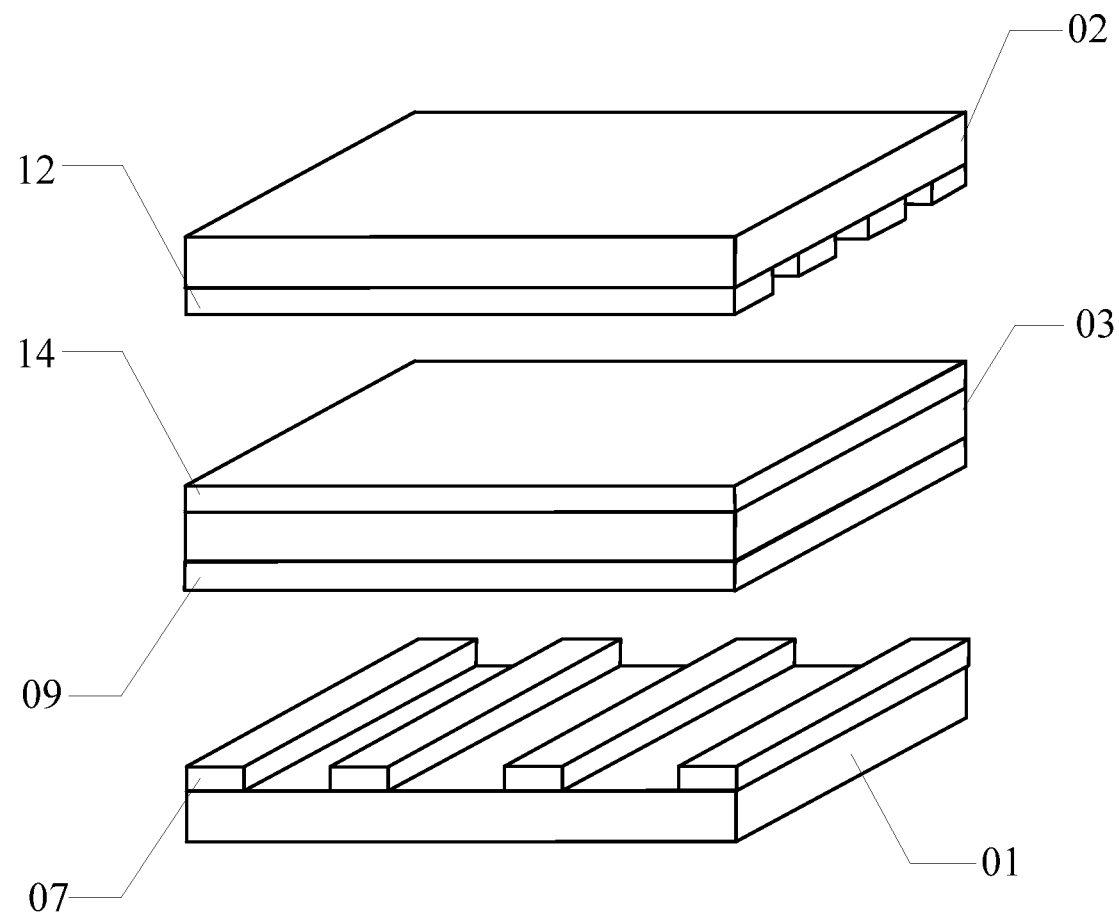
FIGS. 4a, to 4d, are specific schematic structural views showing the liquid crystal lens in accordance with the exemplary embodiment of the invention.
Figure 4B:
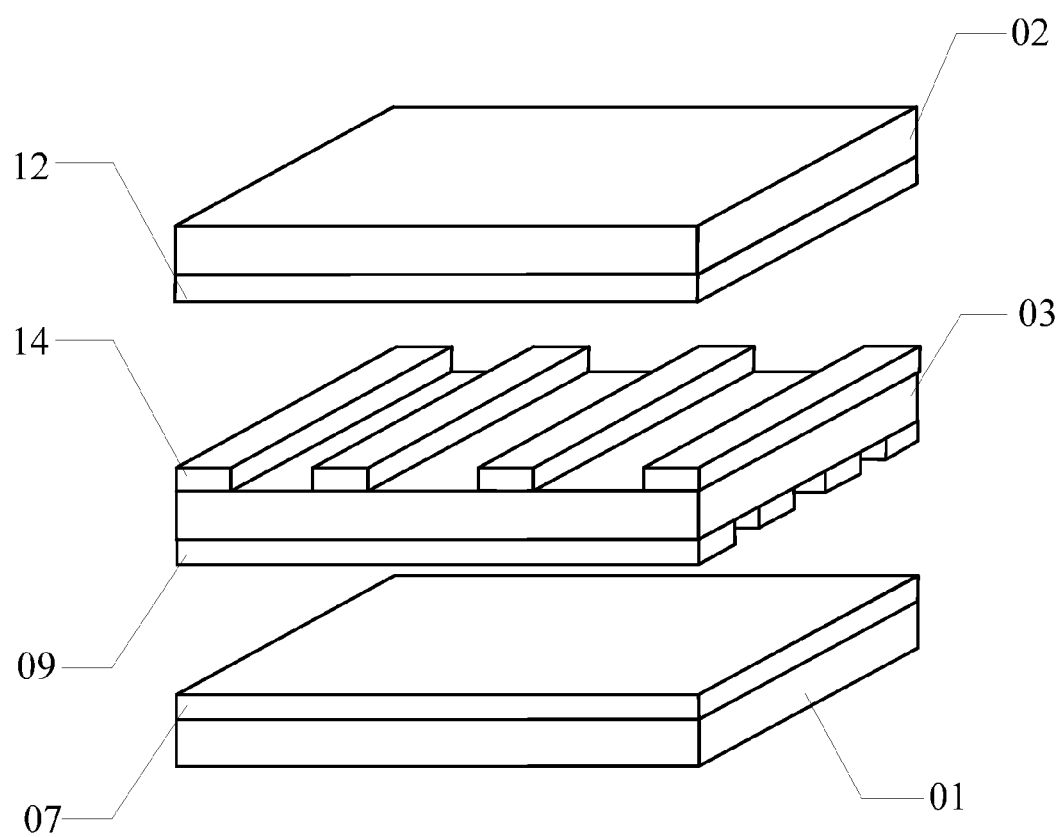
Figure 4C:
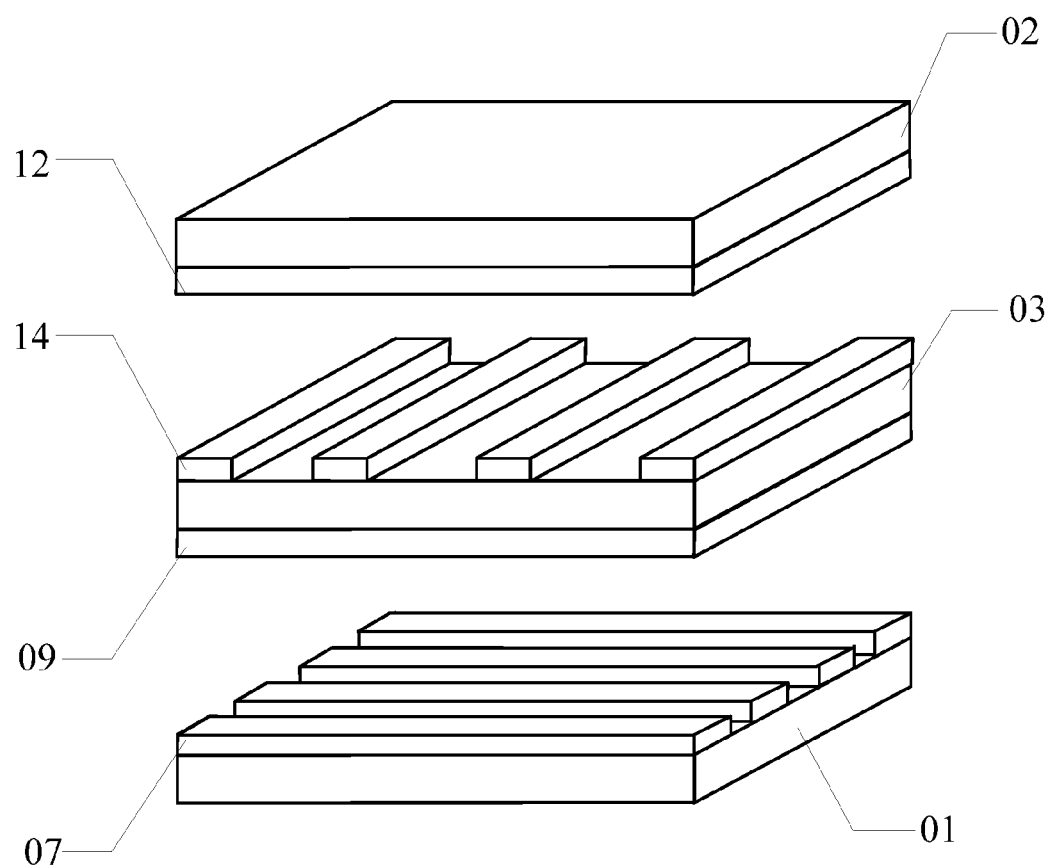
Figure 4D:
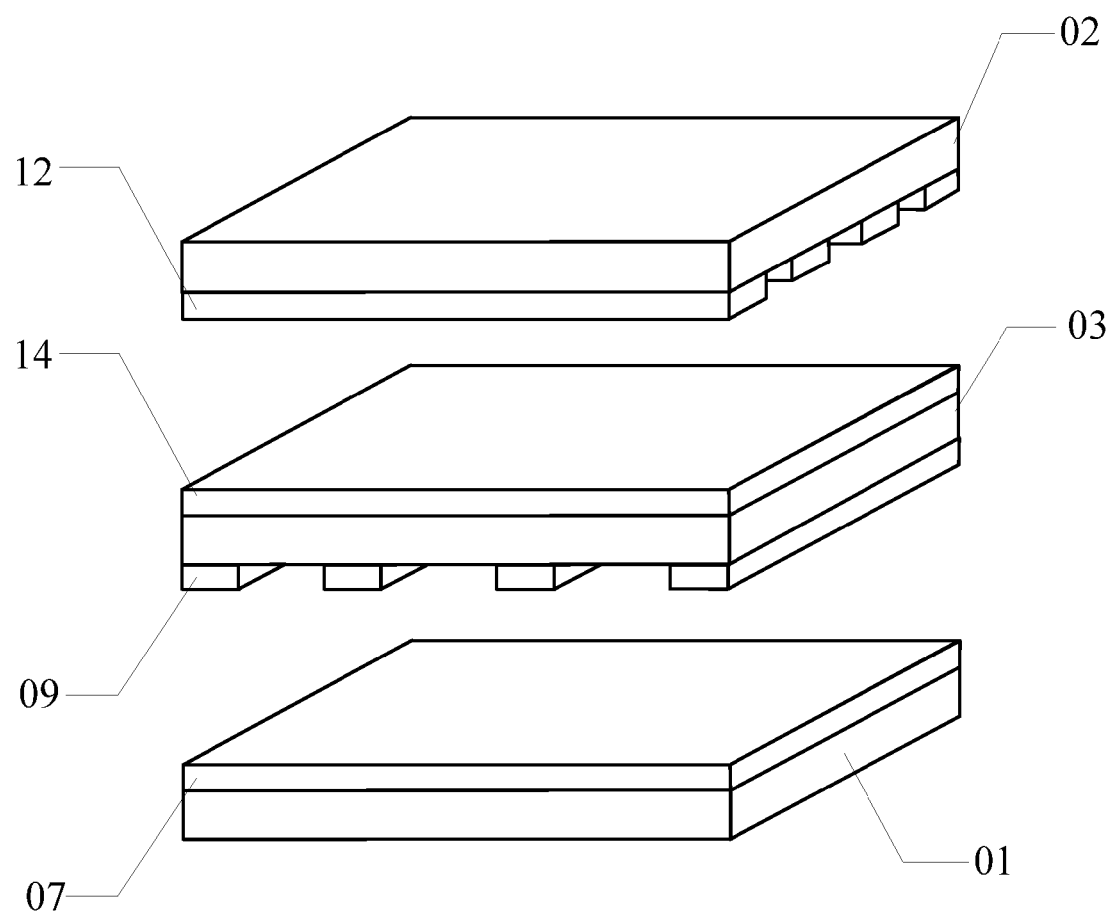

FIGS. 4a, to 4d, are specific schematic structural views showing liquid crystal lens in accordance with four exemplary embodiments of the invention.

In a first exemplary embodiment of the invention, as shown in FIG. 4a,, both of the first transparent electrode 07 disposed on the lower substrate 01 and the third transparent electrode 12 disposed on the upper substrate 02 are set as the strip electrodes, and both of the second transparent electrode 09 and the fourth transparent electrode 14 disposed on either sides of the common substrate 03 are set as the planar electrodes. Further, in the case of the strip electrodes, the extending direction of the first transparent electrode 07 is perpendicular to that of the third transparent electrode 12 each other.

In a second exemplary embodiment of the invention, as shown in FIG. 4b,, both of the first transparent electrode 07 disposed on the lower substrate 01 and the third transparent electrode 12 disposed on the upper substrate 02 are set as the planar or plate electrodes, and both of the second transparent electrode 09 and the fourth transparent electrode 14 disposed on either sides of the common substrate 03 are set as the strip electrodes. Further, in the case of the strip electrodes, the extending direction of the second transparent electrode 09 is perpendicular to that of the fourth transparent electrode 14 each other.

In a third exemplary embodiment of the invention, as shown in FIG. 4c,, both of the first transparent electrode 07 disposed on the lower substrate 01 and the fourth transparent electrode 14 disposed on the common substrate 03 are set as the strip electrodes, and both of the second transparent electrode 09 disposed on the common substrate 03 and the third transparent electrode 12 disposed on the upper substrate 02 are set as the planar or plate electrodes. Further, in the case of the strip electrodes, the extending direction of the first transparent electrode 07 is perpendicular to that of the fourth transparent electrode 14 each other.

In a fourth exemplary embodiment of the invention, as shown in FIG. 4d,, both of the first transparent electrode 07 disposed on the lower substrate 01 and the fourth transparent electrode 14 disposed on the common substrate 03 are set as the planar or plate electrodes, and both of the second transparent electrode 09 disposed on the common substrate 03 and the third transparent electrode 12 disposed on the upper substrate 02 are set as the strip electrodes. Further, in the case of the strip electrodes, the extending direction of the second transparent electrode 09 is perpendicular to that of the third transparent electrode 12 each other.

It should be noted that the first alignment film 08, the second alignment film 10, the third alignment film 13 and the fourth alignment film 14 are not shown in FIGS. 4a, to 4d. Further, the specific preparations of the liquid crystal lens are known in the prior art and is not described in detail herein.

In an exemplary embodiment, the first to fourth transparent electrodes may be made of ITO or IZO, however, the invention is not limited thereto.

In a further embodiment of the invention, there is provided a 3D display device comprising a display and the liquid crystal lens described above in various embodiments of the invention, the liquid crystal being disposed on the display.

In an exemplary embodiment, the above display may comprise a liquid crystal display, a field emitting display (FED), an organic light emitting display (OLED), a plasma display panel (PDP), a cathode-ray tube (CRT) display or the like.

Conventionally, one pixel in the display includes three sub-pixel units, such as red, green, and blue sub-pixel units. In the 3D display mode, images viewed by the left eye may be displayed on odd columns of the sub-pixel units, and images viewed by the right eye may be displayed on even columns of the sub-pixel units. Alternatively, when n columns of sub-pixel units are taken as one cycle, the images viewed by the left and right eyes may be display alternatively or at an interval, however, the invention is not limited thereto.

In an exemplary embodiment, in the liquid lens, each of the first lenses may be disposed to correspond to at least two adjacent columns of the sub-pixel units in the display, and each of the second lenses may be disposed to correspond to at least two adjacent rows of the sub-pixel units in the display. In another exemplary embodiment, in the liquid crystal lens, each of the first lenses may be disposed to correspond to at least two adjacent rows of the sub-pixel units in the display, and each of the second lenses may be disposed to correspond to at least two adjacent columns of the sub-pixel units in the display. In this way, the first and second lenses may correspond to the sub-pixel units displaying the images viewed by the left and right eyes simultaneously, thereby the images viewed by the left and right eyes are separated by the liquid crystal lens and the 3D display is achieved.

In an exemplary embodiment, each of the first lenses may be disposed to correspond to two adjacent columns of the sub-pixel units, and each of the second lenses may be disposed to correspond to two adjacent rows of the sub-pixel units. In another embodiment, each of the first lenses may be disposed to correspond to two adjacent rows of the sub-pixel units, and each of the second lenses may be disposed to correspond to two adjacent columns of the sub-pixel units.

In the liquid crystal lens and the 3D display device according to various embodiment of the invention, the liquid crystal lens comprises a lower substrate, an upper substrate disposed opposite to the lower substrate, and a common substrate disposed between the upper substrate and the lower substrate. A plurality of first lenses are disposed between the lower substrate and the common substrate, and in the 3D display mode, each of the first lenses only converges light component of the incident natural light in the first polarization direction. A plurality of second lenses are disposed between the upper substrate and the common substrate, and in the 3D display mode, each of the second lenses only converges the light component of the incident natural light in the second polarization direction, for example, different from the first polarization direction. In the 3D display device, the liquid crystal lens is disposed on the display, and the first and second lenses converge the polarized light in two directions of the natural light emitted from the display, respectively, thereby achieving the 3D display. Compared with the liquid crystal lens in the prior art in which the 3D display is achieved by adding a layer of polarizer onto the display, the liquid crystal lens of the invention can reduce loss of light energy, improve transmittance of the liquid crystal lens. Thus, display luminance of the 3D display device is greatly enhanced as a whole, and 3D display with high brightness is achieved. Further, since two layers of liquid crystal lenses are employed in the invention, the polarized light in the first and second directions are split by the liquid crystal lens, thus naked-eye 3D display independent of the polarized light can be achieved.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A liquid crystal lens, comprising:
   a lower substrate;
   an upper substrate disposed opposite to the lower substrate; and
   a common substrate disposed between the upper substrate and the lower substrate,
   a plurality of first lenses disposed between the lower substrate and the common substrate, each of the first lenses only converging a light component of incident natural light in a first polarization direction; and
   a plurality of second lenses disposed between the upper substrate and the common substrate, each of the second lenses only converging the light component of the incident natural light in a second polarization direction different from the first polarization direction,
   wherein a focal point of each of the first lenses and a focal point of each of the second lenses are located on one plane which is parallel with the lower substrate or the upper substrate.

2. The liquid crystal lens according to claim 1, wherein the first polarization direction is substantially orthogonal to the second polarization direction.

3. The liquid crystal lens according to claim 2, wherein each of the first lenses disposed between the lower substrate and the common substrate comprises a first transparent electrode, a first alignment film, a first liquid crystal layer, a second alignment film and a second transparent electrode arranged in this order from the lower substrate, wherein liquid crystal molecules in the first liquid crystal layer are deflectable when a predetermined voltage is applied to the first and second transparent electrodes to generate an electric field.

4. The liquid crystal lens according to claim 3, wherein one of the first and second transparent electrodes is set as a plurality of strip electrodes, and the other is set as a planar electrode, both friction directions of the first and second alignment films are substantially perpendicular to an extending direction of the strip electrodes, and the first liquid crystal layer comprises positive nematic liquid crystal molecules.

5. The liquid crystal lens according to claim 2, wherein each of the second lenses disposed between the upper substrate and the common substrate comprises a third transparent electrode, a third alignment film, a second liquid crystal layer, a fourth alignment film and a fourth transparent electrode arranged in this order from the upper substrate, wherein liquid crystal molecules in the third liquid crystal layer are deflectable when a predetermined voltage is applied to the third and fourth transparent electrodes to generate an electric field.

6. The liquid crystal lens according to claim 5, wherein one of the third and fourth transparent electrodes is set as a plurality of strip electrodes, and the other is a planar electrode, both friction directions of the third and fourth alignment films are substantially perpendicular to an extending direction of the strip electrodes, and the second liquid crystal layer comprises positive nematic liquid crystal molecules.

7. A 3D display device, comprising:
   a display; and
   the liquid crystal lens according to claim 1, the liquid crystal lens being disposed on the display.

8. The 3D display device according to claim 7, wherein the first polarization direction is substantially orthogonal to the second polarization direction.

9. The 3D display device according to claim 8, wherein each of the first lenses disposed between the lower substrate and the common substrate comprises a first transparent electrode, a first alignment film, a first liquid crystal layer, a second alignment film and a second transparent electrode arranged in this order from the lower substrate, wherein liquid crystal molecules in the first liquid crystal layer are deflectable when a predetermined voltage is applied to the first and second transparent electrodes to generate an electric field.

10. The 3D display device according to claim 9, wherein one of the first and second transparent electrodes is set as a plurality of strip electrodes, and the other is set as a planar electrode, both friction directions of the first and second alignment films are substantially perpendicular to an extending direction of the strip electrodes, and the first liquid crystal layer comprises positive nematic liquid crystal molecules.

11. The 3D display device according to claim 8, wherein each of the second lenses disposed between the upper substrate and the common substrate comprises a third transparent electrode, a third alignment film, a second liquid crystal layer, a fourth alignment film and a fourth transparent electrode arranged in this order from the upper substrate, wherein liquid crystal molecules in the third liquid crystal layer are deflectable when a predetermined voltage is applied to the third and fourth transparent electrodes to generate an electric field.

12. The 3D display device according to claim 11, wherein one of the third and fourth transparent electrodes is set as a plurality of strip electrodes, and the other is a planar electrode, both friction directions of the third and fourth alignment films are substantially perpendicular to an extending direction of the strip electrodes, and the second liquid crystal layer comprises positive nematic liquid crystal molecules.

13. The 3D display device according to claim 7, wherein
- each of the first lenses of the liquid crystal lens corresponds to at least two adjacent columns of sub-pixel units in the display, and each of the second lenses of the liquid crystal lens corresponds to at least two adjacent rows of sub-pixel units in the display; or
- each of the first lenses of the liquid crystal lens corresponds to at least two adjacent rows of sub-pixel units in the display, and each of the second lenses of the liquid crystal lens corresponds to at least two adjacent columns of sub-pixel units in the display.

14. The 3D display device according to claim 7, wherein the display comprises a liquid crystal display, a field emitting display, an organic light emitting display, a plasma display panel or a cathode-ray tube display.

\* \* \* \* \*